(No Model.) 2 Sheets—Sheet 1.
M. R. SHERRERD.
VALVE.
No. 587,107. Patented July 27, 1897.
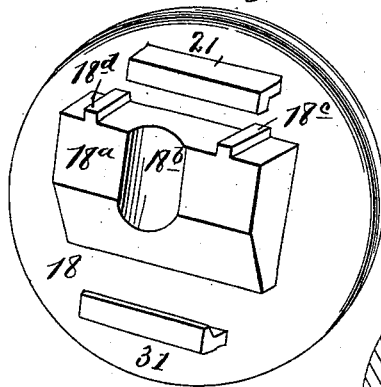
Fig. 4.
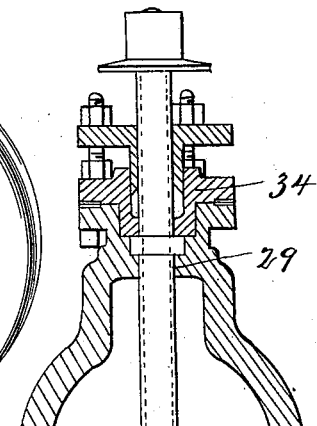
Fig. 5.
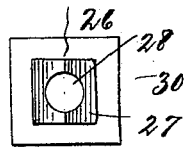
Fig. 1.ᵃ
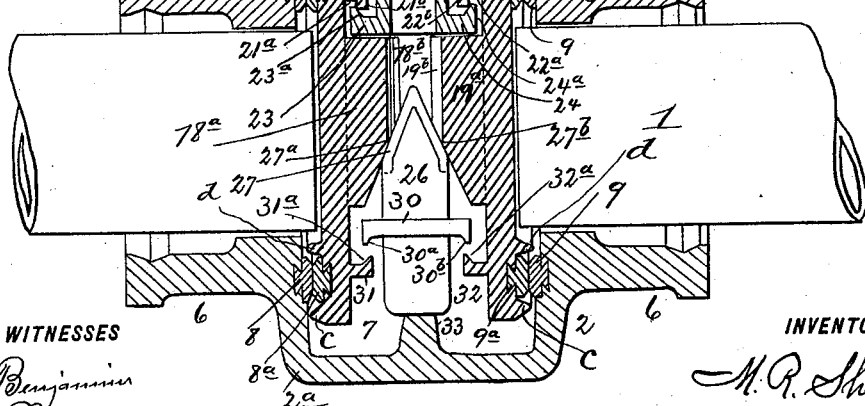
Fig. 1.
WITNESSES
C. W. Benjamin
D. W. _____
INVENTOR
M. R. Sherrerd,
BY T. F. Bourne,
his ATTORNEY (No Model.) 2 Sheets—Sheet 2.
M. R. SHERRERD.
VALVE.
No. 587,107. Patented July 27, 1897.
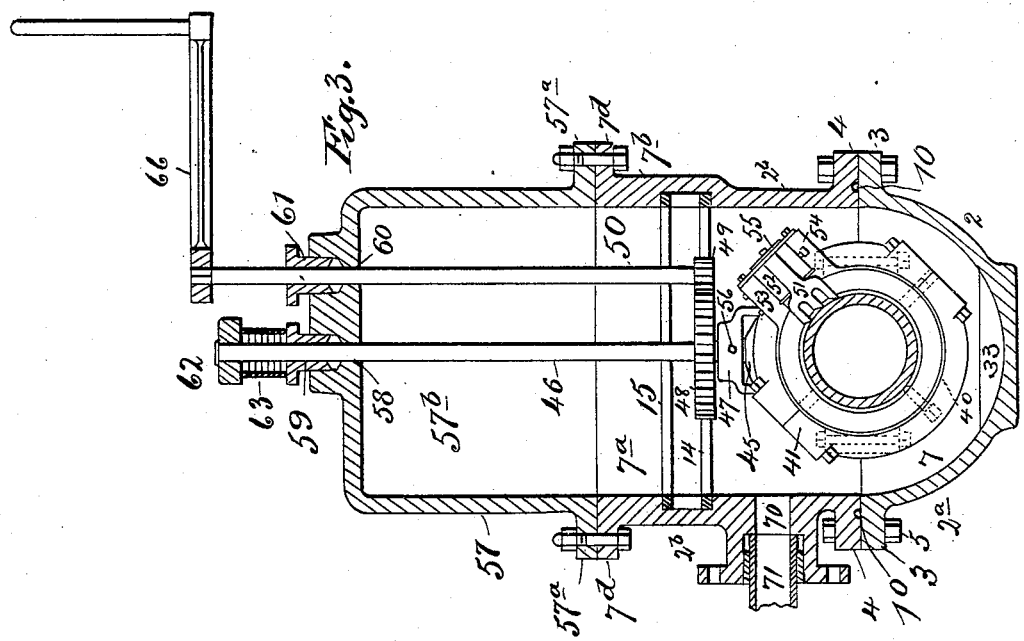
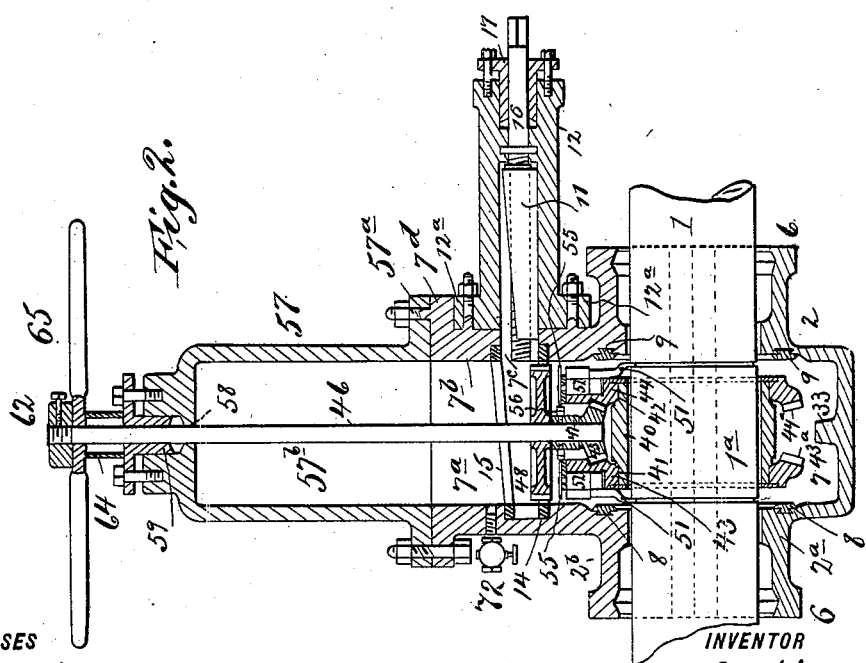
WITNESSES
C. W. Benjamin
D. W. Bunch
INVENTOR
M. R. Sherrerd
BY
T. F. Bourne
his ATTORNEY

UNITED STATES PATENT OFFICE.

MORRIS R. SHERRERD, OF NEWARK, NEW JERSEY.

VALVE.

SPECIFICATION forming part of Letters Patent No. 587,107, dated July 27, 1897.

Application filed January 9, 1897. Serial No. 618,528. (No model.)

*To all whom it may concern:*

Be it known that I, MORRIS R. SHERRERD, a citizen of the United States, and a resident of Newark, in the county of Essex and State of New Jersey, have invented certain new and useful Improvements in Valves, of which the following is a specification.

The object of my invention is to enable a valve—such as a gate-valve, for instance—to be inserted in a pipe without the necessity of shutting off the flow of water or fluid through the pipe during the operation.

The invention consists in a divided or split valve-casing adapted to be clamped around a pipe and having a divided or split seat or seats and a valve adapted to close against said seat or seats.

The invention further consists in a divided or split casing having a divided or split seat or seats and a chamber adapted to receive a pipe-cutter within it to enable said pipe-cutter to cut out a cross-section of a pipe within said chamber, said casing having a removable portion or bonnet adapted to receive said pipe-cutter and means for closing off said casing between its valve seat or seats and the removable portion or bonnet to enable said pipe-cutter to be removed without permitting a flow of fluid from the pipe through the space left by the cut-out portion during such removal.

The invention also consists in certain improvements in gate-valves, and, further, in the novel details of improvement and the combinations of parts that will be more fully hereinafter set forth, and then pointed out in the claims.

Reference is to be had to the accompanying drawings, forming part hereof, wherein—

Figure 1 is a vertical central section through my improved valve, showing it in position on a pipe which has had a cross-section cut out. Fig. 1$^a$ is a plan view of a wedge or block for spreading the gates against their seats. Fig. 2 is a vertical central section through the divided or split valve-casing, showing a pipe-cutter within said casing. Fig. 3 is a similar view at right angles to Fig. 2. Fig. 4 is a perspective view of the gate or valve disk, and Fig. 5 is a perspective view of the wedge or block for expanding the gates.

In the accompanying drawings, in which similar numerals and letters of reference indicate corresponding parts in the several views, 1 indicates a pipe, and 2 is a valve-casing which is divided or split longitudinally and adapted to be clamped around the pipe. For this purpose the parts $2^a$ $2^b$ of the casing along the divided edges are provided with flanges 3 4, having provision for bolts 5 to fasten them together. The valve-casing has recesses in its hubs or arms 6 to receive packing around the pipe in well-known manner. The casing 2 has a chamber 7, which surrounds pipe 1 and is of sufficient area or volume to permit a cutting device to operate within it, as hereinafter explained.

The valve-casing 2 is provided with seats 8 9, and these seats are divided or split transversely coincidently with the division of the parts $2^a$ $2^b$ of said casing, so that said seats can be clamped around pipe 1 when the valve-casing is secured thereon. By preference these seats 8 9 are ring-like or semirings, which may be secured to the respective portions $2^a$ $2^b$ of the valve-casing 2 by dovetail joints (see Figs. 1 and 2) or otherwise. In order that the divided valve-seats shall meet accurately when the parts $2^a$ $2^b$ of casing 2 are clamped around a pipe, the parts $2^a$ $2^b$ are provided with dowel-pins and sockets 10, (see Fig. 3,) and the parts $2^a$ $2^b$ may thus be held together with the seats 8 9 attached when said seats are faced or ground. The casing 2 has an opening $7^a$, which leads through one side or wall and communicates with chamber 7, to receive or permit the passage of a pipe-cutter, as well as a valve. This opening is shown located in an extension $7^b$ on part $2^b$ of casing 2.

In order to allow chamber 7 of the valve-casing 2 to be closed water or fluid tight while a pipe-cutter is being removed and while a gate-valve is being connected with the casing 2, a valve is connected with said casing and adapted to close opening $7^a$. For this purpose I have shown a valve 11, carried in a chamber or hollow housing or casing 12, projecting from one wall of extension $7^b$, which extension is provided with an opening $7^c$ in line with said housing. (See Fig. 2.) I have shown the housing 12 as provided with a flange or lugs $12^a$, by which it can be screwed or bolted upon extension $7^b$, whereby said housing and its valve can be removed and replaced by a plate 13, Fig. 1, after a section of pipe is cut out and removed and a gate-valve inserted in its place. By this means said housing and its valve can be used with other casings 2 to reduce expenses. The hollow extension $7^b$ is shown provided with interior seats 14 15 for valve 11, arranged to cause a tight fit of said valve within opening or way $7^a$. Suitable means may be provided for pushing valve 11 into opening or way $7^a$ and for withdrawing it therefrom. I have shown a screw 16 journaled in housing 12 and meshing with corresponding threads carried by valve 11, the screw 16 passing through a stuffing-box 17, carried by said housing. The screw 16 may have a squared outer end to receive a handle by which it may be turned.

Any suitable valve may be used to close against the seat or seats 8 9. I have shown an improved gate-valve arranged as follows: 18 19 are gates or disks carrying seats $8^a$ $9^a$ to close against seats 8 9, (see Fig. 1,) and these gates or disks are provided with inclined projections $18^a$ $19^a$, which are located on the sides opposite the seats $8^a$ $9^a$. These projections are each shown provided with a recess $18^b$ $19^b$, to permit the passage of a feeding-screw 20 between disks or valves 18 19. Near their upper edges the disks 18 19 each have an extension 21 22, which are undercut at $21^a$ $22^a$, forming overhanging ledges or flanges $21^b$ $22^b$. These ledges or flanges are adapted to be engaged by projecting arms 23 24, carried by a lifter or lifting-tube 25, adapted to raise and lower the gates or disks 18 19. The arms 23 24 are shown provided with upwardly and outwardly inclined surfaces $23^a$ $24^a$, adapted to bear against the ledges $21^b$ $22^b$, so that as the lifter 25 rises (when the valves are against their seats) these inclined surfaces will draw the ledges $21^b$ $22^b$ toward each other, thereby acting to move seats $8^a$ $9^a$ away from seats 8 9 before the disks 18 19 are carried away from seats 8 9. The gates or disks 18 19 are shown provided with lugs $18^c$ $18^d$, (see Fig. 4,) which are adapted to receive the ends of arms 23 24, against which lugs said arms may abut. These lugs serve with the arms 23 24 to keep the gates from turning relatively to lifter 25.

The disks or valves 18 19 are pressed toward seats 8 9 by means of a wedge or inclined block 26, that is adapted to bear against the inclined faces of projections $18^a$ $19^a$. This wedge or block 26 is shown provided with a brass or similar cap 27, having two oppositely-inclined faces $27^a$ $27^b$. The ledge or block 26 is provided with a bore 28 (see Fig. $1^a$) to permit the passage of screw 20. The wedge or block 26 is shown provided with an extension, shelf, or flange 30, that is adapted to be raised by projections 31 32, carried by gates or disks 18 19, so as to carry the wedge or block up and down with the gates. The extension or flange 30 is shown provided with depending ledges $30^a$ $30^b$, having downwardly and outwardly inclined faces that are adapted to engage corresponding faces on ledges $31^a$ $32^a$, carried by projections 31 32. These ledges $30^a$ $31^a$ and $30^b$ $32^a$ coact to draw the lower parts of the gates or disks 18 19 toward each other when they are lifted or suspended by lifter 25 to cause the seats $8^a$ $9^a$ to clear the projecting ends of pipe 1 as the gates are raised and lowered. Furthermore, for this purpose I have shown the disks 18 19 (see Fig. 2) as provided at their upper edges with webs or projections $a$, which extend outwardly beyond the working faces of seats $8^a$ $9^a$.

When the gates are against their seats, the webs or projections $a$ enter recesses $b$ in the inner wall of opening or way $7^a$, the surface of said wall being in such position that when projection $a$ rises with the gate said wall will act with said projection to push the gate and its seat away from seat 9. At the lower parts of the gates 18 19, on opposite sides of or above and below the seats $8^a$ $9^a$, are located projecting webs $c$ $d$, that are preferably semicircular and that are adapted to encounter the ends of pipe 1, that project into chamber 7. The sides or faces of webs $c$ $d$ are inclined or beveled, as shown, to cause them to ride freely past the ends of the pipe 1. With this arrangement as the gates are moved to close the ends of pipe 1 within chamber 7 of casing 2 the webs $c$ will encounter the ends of the pipe, whereupon the gates will be moved toward each other, and as the webs $c$ slide along the pipe they will keep the seats $8^a$ $9^a$ from touching the latter, and when webs $c$ pass away from the pipe the webs $d$ will still keep the seats $8^a$ $9^a$ from touching the pipe. After webs $d$ pass from the ends of the pipe the seats $8^a$ $9^a$ may close against seats 8 9. When the gates are to be moved from the position shown in Fig. 1 or raised, the webs $d$ will first encounter the ends of the pipe to move the seats $8^a$ $9^a$ out of possible engagement with the pipe, and the projections $a$ will engage the walls of the opening or way $7^a$ to separate the upper parts of said seats from seats 8 9. When webs $d$ pass from the pipe, webs $c$ will continue to hold the seats $8^a$ $9^a$ from touching the pipe. By these means the seats $8^a$ $9^a$ are kept from slipping along the rough edges of the severed pipe to prevent injury to said seats. When the webs $a$ $c$ $d$ are used, the inclined faces $23^a$ $24^a$, as well as the projections $30^a$ $30^b$ $31^a$ $32^a$, may be dispensed with, if desired; but of course other means may be provided to draw or move the gates inwardly or toward each other, if desired. The wedge or block 26 is shown abutting against a rib 33 on the bottom of casing 2.

The screw 20 meshes with threads $25^a$ in the bore of lifter 25, and as the screw is rotated it will act to raise or lower the lifter 25 and gates 18 19. The lower end of the lifter or its arms 23 24 act on projections $18^a$ $19^a$ of gates 18 19 to push the latter upon the wedge or block 26 to cause the gates to spread apart to close the valve. The screw 20 is shown journaled in a bearing 29 and a stuffing-box 34, carried by a bonnet or cover 35, secured on extension 7$^b$ of casing 2. Bonnet or cover 35 is shown provided with a flange 35$^a$, resting upon a flange 7$^d$ of extension 7$^b$, to which it is bolted. The chamber of the bonnet 35 and the opening or way 7$^a$ above opening 7$^c$ are of sufficient length to receive the gate-valve and its parts within them, so that valve 11 can be closed between said gate-valve and the chamber 7 of casing 2.

Any suitable pipe-cutting device may be used that will enter chamber 7 of casing 2 and rotate therein around pipe 1. I have shown a pipe-cutter arranged as follows, (see Figs. 2 and 3:) 40 is a frame which is divided crosswise and adapted to be clamped around pipe 1 within chamber 7 of casing 2. Frame 40 has two parallel peripheral annular guideways 41 42, upon which cutter-carriers or rings 43 44 are adapted to be clamped and rotated. The carriers 43 44 have gear-teeth 43$^a$ 44$^a$, adapted to be engaged by a pinion or gear-wheel 45$^a$, carried by a shaft 46, journaled in yoke or bridge 47, carried by frame 40. Shaft 46 may be rotated direct to rotate carriers 43 44, but I have shown it provided with a gear-wheel 48, that meshes with a pinion 49, carried by a shaft 50. (See Fig. 3.) Cutters 51 are shown carried by a sliding head 52, guided in ways 53 54, carried by each cutter-carrier or ring 43 44. To the heads 52 are connected star-wheels 55, adapted to encounter studs 56, carried by yoke 47 or frame 40 to feed the tools intermittently as the cutter-carriers rotate. With this arrangement as the cutter-carriers rotate around the pipe the two cutters or tools will be carried around the pipe in unison, so as to make two cuts in the pipe in parallel planes at such a distance apart as to cut out a section of pipe between the valve-seats 8 9, so that the section of pipe 1$^a$ thus cut out can be lifted from between said seats 8 9 without encountering them.

57 is a bonnet or cover having a flange 57$^a$ to be bolted upon flange 7$^d$ of extension 7$^b$ of casing 2, said bonnet having a chamber 57$^b$, alined with opening or way 7$^a$ and chamber 7 of casing 2 and of such dimensions as to enable it to receive the pipe-cutter within it above the plane of valve 11. (See Figs. 2 and 3.) The bonnet or cover 57 has a bearing 58 and a stuffing-box 59 to receive shaft 46 and a bearing 60 and stuffing-box 61 to receive shaft 50. These two shafts being thus guided and extending parallel serve to keep the pipe-cutter from twisting and thus keep the cut-out section of pipe from turning when it is being raised from pipe 1.

62 is a head or nut on shaft 46, which may rest on the stuffing-box 59 or on interposed washers 63 or a tube 64 to sustain the pipe-cutter when pipe 1 is cut through, and 65 is a handle on shaft 46 by which it and the attached pipe-cutter can be raised within bonnet 57 above valve 11. 66 is a crank on shaft 50 for rotating the latter.

The devices hereinbefore described are used as follows: If the pipe is underground, the earth is excavated around it where the valve is to be inserted, the pipe-cutter is then clamped around the pipe, the tools set in position for operation, and part of the cuts in the pipe may be made. The parts 2$^a$ 2$^b$ of the divided valve-casing 2, with the attached divided valve-seats, are then clamped around the pipe with the pipe-cutter within chamber 7 of said casing, and the spaces within hubs 6 around the pipe are packed. Valve 11 is placed in open position and bonnet or cover 57 is secured upon the casing with shafts 46 and 50 in position in their bearings and stuffing-boxes on the bonnet or cover. The cutting edges of the tools 51 are placed at a distance apart less than the distance between the valve-seats 8 9, or at least between the edges of said seats adjacent to opening 7$^a$, so that a cut-out section of pipe will be sufficiently short to enable it to be withdrawn from chamber 7 of casing 2, together with the cutting-machine, after the cut is made without interfering with seats 8 9. The parts being in the positions set forth, shaft 50 is rotated, whereupon cutter-carriers or rings 43 44 will rotate and carry the tools 51 around pipe 1, thus cutting out a section 1$^a$ of the pipe. (See Fig. 2.) Shaft or rod 46 is now raised or drawn outwardly, whereby the cutting-machine with its attached cut-out section 1$^a$ of the pipe will be lifted out of valve-casing 2 into bonnet or cover 57 above the plane of valve 11. Fluid from pipe 1 fills the chamber or space 7 7$^a$ 57$^b$ and surrounds the pipe-cutter, whereupon valve 11 is closed to shut off chamber 7 and prevent the flow of fluid therefrom. The bonnet 57, with the contained pipe-cutter and the attached section of pipe, are next removed from casing 2, and the bonnet 35, with the gate-disks, is attached to casing 2, so that said disks can act against seats 8 9 after valve 11 is again opened. (In this position the gate-valve can be left to be used when desired.) After the gate-valve has closed the ends of pipe 1 valve 11 and its casing or housing can be detached from the valve-casing and replaced by a plate or cover 13 or other means to close opening 7$^c$. The gate-valve can be used to regulate the flow of fluid through pipe 1 in well-known manner. It will thus be seen that by means of my invention I can insert a valve in a pipe without the necessity of stopping the flow of fluid or reducing its pressure in the line or interfering with the supply. This will be found of advantage in city water and gas supplies, where it is often advisable to insert additional valves in old lines of pipe to control the supply. Valves could not heretofore, to my knowledge, be inserted in a line of pipe without first stopping the flow through the same. My invention is also advantageous where it becomes necessary to repair a break in a pipe while it is important to maintain a constant supply. This feature is particularly desirable to prevent an interruption in water-supply on account of the danger of interfering with fire protection during the time the line or lines may be shut off. In these cases it will only be necessary to insert two of my improved valves in a pipe on opposite sides of the break or a valve between the break and the reservoir or source of supply in order to shut off the flow of fluid to the break, whereupon the latter can be repaired.

The invention is also of advantage in shutting off the cut-out section of pipe during the alteration of alinement or the laying of an offset line to change the location of a pipe through which it is important to maintain a constant supply.

If desired, the casing 2 may have one or more branch outlets or ways 70, to which a branch pipe or pipes 71 or a valve may be connected in any well-known manner. (See Fig. 3.)

72 is a cock shown connected with extension $7^b$, by which the latter can be drained.

I do not limit my invention to the details of construction shown and described, as they may be varied without departing from the spirit of my invention.

Having now described my invention, what I claim is—

1. A divided or split valve-casing adapted to be clamped around a pipe and having a chamber adapted to receive a pipe-cutting machine, and a divided or split valve-seat also adapted to surround a pipe, and a valve adapted to close against said seat, and means to permit the withdrawal of a pipe-cutting machine from said chamber without allowing a flow of water from the casing, substantially as set forth.

2. A divided or split valve-casing adapted to be clamped around a pipe and having a chamber adapted to receive a pipe-cutting machine, and divided or split valve-seats also adapted to be clamped around a pipe, combined with a gate-valve adapted to close against said seats, and means to permit the withdrawal of a pipe-cutting machine from said chamber without allowing a flow of water from the casing, substantially as set forth.

3. A divided valve-casing having a divided valve-seat and a chamber adapted to receive a pipe-cutter to operate therein around a pipe, a removable bonnet or cover carried by said casing communicating with said chamber, and a valve for closing off said casing between its chamber and the bonnet or cover, substantially as set forth.

4. A divided valve-casing having a divided valve-seat and a chamber adapted to receive a pipe-cutter to operate therein upon a pipe, a removable bonnet or cover carried by said casing communicating with said chamber, a housing carried by said casing and communicating with said chamber, a valve carried in said housing and means to operate said valve to close said chamber, substantially as set forth.

5. The combination of a divided valve-casing adapted to be clamped around a pipe and having a divided valve-seat and a chamber to surround the pipe, an extension carried by said casing and having an opening or way leading to said chamber and means to close said opening, with a bonnet or cover adapted to be connected with said extension, and means to cut a portion out of a pipe while within said chamber, substantially as set forth.

6. The combination of a divided valve-casing adapted to be clamped around a pipe and having a divided valve-seat and a chamber to surround the pipe, an extension carried by said casing and having an opening or way leading to said chamber, and means to close said opening, with a bonnet or cover adapted to be connected with said extension, said bonnet or cover having a stuffing-box, a pipe-cutting machine adapted to operate within the chamber of said casing, and a shaft to pass through said stuffing-box to operate said cutting-machine, substantially as set forth.

7. The combination of a divided valve-casing having a chamber and an opening leading thereto, and divided valve-seats, and means to close said opening, with a removable bonnet or cover having a stuffing-box and adapted to be connected with said casing, a screw journaled in said stuffing-box, and a gate-valve to be operated by said screw, substantially as set forth.

8. The combination of a divided valve-casing having a chamber and an opening leading thereto, and divided valve-seats, a hollow extension carried by said casing, a valve connected with said extension to close the opening therein, a removable bonnet connected with said extension, a stuffing-box or bearing carried by said bonnet, a gate-valve and a screw journaled in said stuffing-box or bearing, substantially as set forth.

9. The combination of a divided valve-casing having a chamber and an opening leading thereto, and a divided valve-seat, a hollow extension carried by said casing, a valve connected therewith, a removable bonnet or cover having a stuffing-box, a pipe-cutting machine, and a shaft journaled in said stuffing-box to operate said machine, substantially as set forth.

10. In a valve, a gate or disk having a seat and webs carried by said gate or disk on opposite sides of said seat, adapted to act against a pipe to keep the seat from engaging said pipe, substantially as set forth.

11. In a valve, the combination of two gates or disks having ledges, projections carried by said gates or disks having inclined faces, and lugs carried by said disks, with a lifter having arms to act with said ledges and arranged to engage said lugs, and a wedge or block to act on the inclined faces of said projections, substantially as set forth.

12. A gate-valve comprising two disks having valve-seats, projections carried by said disks having inclined opposed faces, ledges carried by said disks, a lifter having inclined faces to act on said ledges to draw the disks toward each other, and a wedge or block to act on the inclined faces of said projections, substantially as set forth.

13. A gate-valve comprising two disks having valve-seats, projections carried by said disks having inclined opposed faces, ledges carried by said disks, a lifter having arms to operate with said ledges, arms carried by said disks having projections $31^a$, $32^a$, a wedge or block to operate said disks, and extensions carried by said wedge or block to act with the projections $31^a$, $32^a$, to draw the lower parts of said disks toward each other, substantially as set forth.

Signed at New York, in the county of New York and State of New York, this 2d day of January, A. D. 1897.

MORRIS R. SHERRERD.

Witnesses:
D. W. FRENCH,
FRED. A. SMITH.